United States Patent [19]
Goldberg

[11] 3,875,505
[45] Apr. 1, 1975

[54] DATA COLLECTION SYSTEM AND APPARATUS SUITABLE FOR USE THEREIN

[75] Inventor: Joshua I. Goldberg, Swarthmore, Pa.

[73] Assignee: The Boeing Company, Seattle, Wash.

[22] Filed: May 29, 1973

[21] Appl. No.: 364,840

[52] U.S. Cl. .............. 324/94, 324/168, 324/182, 340/173 CH
[51] Int. Cl. ............................................ G01r 27/22
[58] Field of Search ............ 324/94, 182, 168, 186; 307/268; 328/127; 340/173 CH

[56] References Cited
UNITED STATES PATENTS

| | | | |
|---|---|---|---|
| 3,387,288 | 6/1968 | Bissett et al. ................... | 340/173 R |
| 3,436,756 | 4/1969 | Myers et al. ................... | 324/186 X |
| 3,440,566 | 4/1969 | Swanson ........................ | 307/268 X |
| 3,754,122 | 8/1973 | Dinapoli et al. ................ | 324/94 |
| 3,816,713 | 6/1974 | Dear et al. ..................... | 324/94 X |

FOREIGN PATENTS OR APPLICATIONS

| | | | |
|---|---|---|---|
| 1,159,416 | 7/1969 | United Kingdom .............. | 324/168 |

Primary Examiner—Stanley T. Krawczewicz
Attorney, Agent, or Firm—Joseph M. Corr; Robert S. Lipton; Frederic W. Neitzke

[57] ABSTRACT

A system for producing an indication of the number of occurrences of certain events, such as the traversal of miles by a vehicle, in which a single-pole double-throw reed switch is operated between its two positions in proportion to the number of occurrences of events to be counted; the two positions of the reed switch produce two different corresponding states of a first bistable multivibrator, the output of which is differentiated and clipped in a special clipping circuit to remove one polarity of differentiated pulse. The remaining differentiated pulses are applied to pass a predetermined amount of charge per pulse through an electrochemical storage cell, whereby the amount of plating of metal from one electrode to the surface of the other at a given time is proportional to the number of differentiated pulses supplied thereto and therefore proportional to the number of events that have occurred. when an indication of this number is desired, a reading current is passed through the electrochemical storage cell in the opposite direction to the current caused by the differentiated pulses, and the time when substantially all of the metal in the cell has been replated upon the original electrode is sensed by an increment in the voltage across the cell. The intensity of the reading current is substantially constant, so that the duration of the reading time provides an indication of the amount of material which had been plated and hence an indication of the number of said events which has occurred. The reading current is automatically and promptly terminated by means of a second bistable multivibrator circuit in response to the above-mentioned increment in cell voltage. Clock pulses are passed through an AND gate only during the reading-current time, thereby to produce a number of clock pulses proportional to the number of occurrences of said event. A common supply-voltage source is utilized for the first multivibrator and for the reading-current circuit, whereby undesired effects on the first multivibrator of variation of in supply voltage are largely cancelled by corresponding changes in the intensity of the reading current. The clipping of the differentiated pulse not used for operating the electrochemical cell is accomplished by means of a semiconductor rectifier diode which is effective for voltages above about 0.6 volt and the portion of the pulse below this voltage is effectively removed by a shunt transistor turned on by the rectangular pulse from which the differentiated pulses are derived.

8 Claims, 7 Drawing Figures 3,875,505
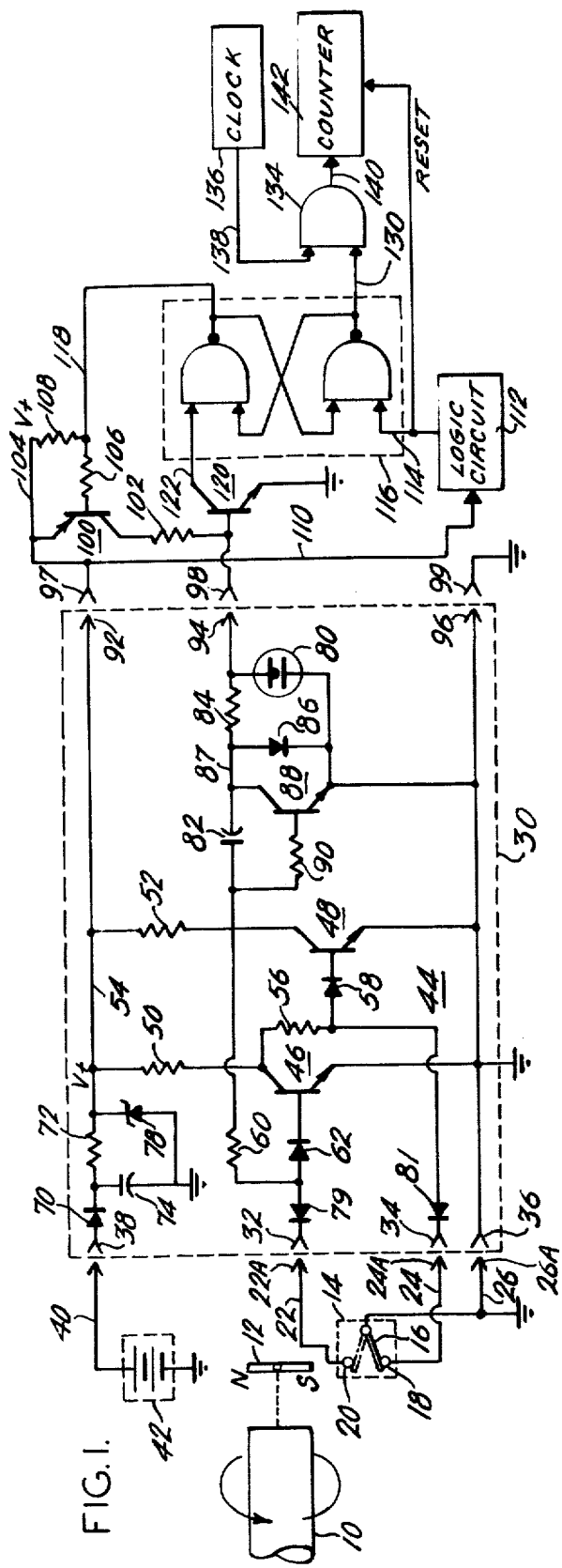
FIG.1.
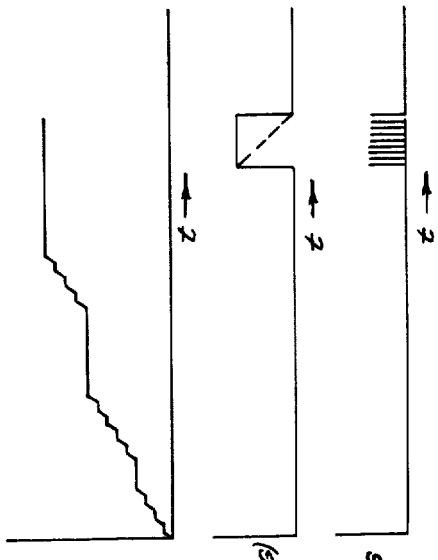
FIG.3A. PLATING
FIG.3B. READOUT CURRENT (AND DEPLATING)
FIG.3C. CLOCK PULSES
FIG.2A.
FIG.2B.
FIG.2C.

3,875,505

DATA COLLECTION SYSTEM AND APPARATUS SUITABLE FOR USE THEREIN

BACKGROUND OF THE INVENTION

There are a variety of applications in which it is desirable to accumulate a count of the number of occurrences of an event, and to provide an indication of the number so accumulated. While in no way limited thereto, the present invention will be described with particular reference to the accumulating of data generated on a vehicle, and particularly on a fleet vehicle such as a public bus, which data are subsequently read out, preferably in a form suitable for direct input to a computer.

Even in the limited application to vehicle data monitoring, there are many types of data which it may be desirable to accumulate and read out in this manner. For example, the number of door openings of a bus may be recorded and read out later to provide an indication of the number of passenger boardings and leavings along different portions of a bus route. The data may also relate to the number of cycles of rotation or reciprocation of a mechanical part of the vehicle, as an aid in servicing. One specific preferred use of such apparatus is to monitor and accumulate data as to the number of revolutions of the wheels of the vehicle, thereby to provide an odometer function indicating the number of miles travelled by the vehicle between readout times such as when the vehicle is in a central depot for servicing.

For such purposes it is known to provide on the vehicle a rotating member geared to the differential, and to provide an indication of the number of revolutions of this member by mechanical counting means connected thereto. Such entirely mechanical systems are relatively expensive, inclined to be unreliable because of wear, and generally do not provide an output of computer form.

It is also known to provide electronic odometers or revolution counting devices, in which typically a magnetic element attached to the rotating member induces electrical pulses upon each revolution, which pulses in turn are supplied to an electronic circuit for counting the pulses and for providing an indication of their accumulated number. Forms of such apparatus previously known are generally relatively expensive, often incorporate mechanical elements subject to wear, in many cases do not provide a computer-type output, and often use relatively high supply power. In some, the recording of data is volatile in the sense that power is required to retain the data, which disappears if the power is interrupted.

Electronic event counters or odometers are also known which utilize an electrochemical cell as the storage element. Such electrochemical cells for use in data handling systems are described, for example, in U.S. Pat. Nos. 3,546,693 to T. B. Bissett et al., issued Dec. 8, 1970; 3,499,323 to J. T. Sturgis, issued Mar. 10, 1970; and 3,603,880, to N. L. Brecker, Jr. et al., issued Sept. 7, 1971.

These electronic systems of the prior art utilizing electrochemical cells tend to suffer from one or more of the drawbacks of excessive expense, unreliability, inaccuracy, or high supply power. One difficulty that has been encountered in such systems arises from use of a magnetically-operable reed switch or the like as the device producing electrical indication of the rotation of the magnetic device attached to the rotating member. Such reed switches often exhibit a tendency toward "chatter", whereby an intended single closure of the reed switch arm to one of its contacts instead results in two or more intermittent closures, producing a number of extra, misleading, electrical pulses. The presence of such extra pulses can introduce unreliability or inaccuracy into the readings produced by the system.

Another source of inaccuracy resides in changes or drifts in the value of the supply voltages used to operate the circuitry, which may result in inaccurate results. This can be particularly troublesome in the case in which the storage and accumulation of the data is accomplished on board a vehicle, for example, and the accumulated data are later read out at a central location such as a service depot or garage to which the vehicle is periodically returned, the readout unit being permanently located at the central location and connected by quick-disconnect means to the on-board unit. In such cases an entirely different supply voltage source has been utilized for the readout operation than is used in the accumulation circuit, and since the two voltage sources may vary entirely independently, the possibility of inaccuracy is substantial in such circumstance.

A further problem arises in such electronic circuitry in which revolution-indicating, substantially rectangular electrical pulses are generated and then differentiated to produce one narrow pulse corresponding to the leading edge and another narrow pulse corresponding to the lagging edge of each pulse, one narrow pulse of each pair being removed prior to use of the other as the source of the data accumulated in the electrochemical cell. Incomplete elimination of the undesired polarity of differentiated pulse subtracts from the accumulation of charge in the electrochemical cell, making the net charging of the cell per revolution smaller, and hence tending to produce inaccuracy. While an ordinary diode clipper may be used to remove the undesired differentiated pulse, it has been found that the typical semiconductor diode is ineffective to remove all of the differentiated pulse, and hence improvements in this respect are also desirable.

In certain known forms of circuitry for similar purposes, more than one electrochemical cell is required and in others the cell must be replaced after each use. It is, of course, desirable to employ only a single such cell which does not have to be replaced.

Furthermore, it has been found that inaccuracies result in the reading out of information from electrochemical cells by conventional methods in which the cell is read out by merely applying a steady current to it and sensing how long the current is applied before the voltage across the cell first rises substantially. Such inaccuracy apparently arises because when an electrode of the cell is nearly completely deplated by the reading current, it often will then no longer be completely covered with a thin layer of metal, but instead will have some areas covered by metal and other areas which are completely deplated. Under these conditions, the voltage across the cell typically will rise abruptly even though deplating is not complete, and appreciable errors in readout will result.

Accordingly, it is an object of the invention to provide new and useful apparatus for the storing and accumulating of data representative of the number of occurrences of an event, and for reading out the number information thus stored.

Another object is to provide such apparatus which is inexpensive, but accurate and reliable.

Another object is to provide such apparatus which is of long life, and does not require high supply power.

A further object is to provide such an apparatus of the type utilizing a magnetically-operated reed switch to provide input signals thereto, and which is substantially immune to the possibly harmful effects of chatter of the reed switch arm against either of its contacts.

Another object is to provide such apparatus of the type in which a pulse is differentiated to produce two opposite-polarity narrow pulses, one of which is to be eliminated, in which an improved degree of such elimination is accomplished in a simple and effective manner.

A further object is to provide such a system in which the harmful effects of variations in supply voltage on accuracy of indication are mitigated.

It is also an object to provide such apparatus exhibiting improved accuracy with respect to the sum of a sequence of successive read-outs of data.

SUMMARY OF THE INVENTION

These and other objects of the invention are achieved in accordance with the invention by the provision of apparatus for accumulating, storing and reading out a quantity representative of the number of occurrences of specified events, comprising one or more, and preferably all, of the following features. Single-pole double-throw reed switch means are provided which are responsive to said occurrences to move the switch arm of the reed switch means between its two switch contacts in response to a predetermined fixed number of said occurrences. First bistable multivibrator means are connected to the contacts of the reed switch means so that when the switch arm thereof is in contact with one of its contacts the first multivibrator means is in one of its states and when the switch arm is in contact with the other of its contacts the first multivibrator means is in its other state, thereby to produce an output pulse at an output terminal of said first multivibrator means comprising a positive-going change in voltage when said switch arm first contacts one of said contacts and a negative-going change in voltage when that switch arm first contacts the other of said contacts.

The substantially rectangular output pulse from the first multivibrator means is applied to a differentiating circuit means, which produces a narrow positive pulse of voltage and a narrow negative pulse of voltage at times corresponding to the edges of each output pulse. One of these differentiated pulses is eliminated by the combination of semiconductor rectifier means connected as a clipper to substantially eliminate the portion of that pulse exceeding a predetermined voltage level, and transistor means having a pair of control electrodes, such as the emitter and collector thereof, connected effectively in parallel with the rectifier means and supplied at its control electrode with the substantially rectangular output pulses, thereby to remove that portion of the differentiated pulse to be removed which has a voltage level less than that at which the rectifier means clips the signal. In this way substantially complete elimination of the undesired differentiated pulse is produced.

The remaining differentiated pulse is applied to an electrochemical storage member to cause an amount of plating therein proportional to the number of said differentiated pulses applied thereto, and hence proportional to the number of said occurrences of said specific event. When it is desired to read out the number information thus stored in the electrochemical cell, a reading current of substantially constant intensity is passed through the electrochemical member in the opposite direction to the current flow produced by the differentiated pulses applied thereto, until the voltage across the electrochemical member increases abruptly; at this time, means preferably comprising a second bistable multivibrator cause the reading current to be promptly terminated. Means are then provided for measuring the duration of the reading current, preferably comprising a source of clock pulses and means for supplying these clock pulses to a clock-pulse counter through an AND gate only when said second multivibrator means is in that one of its states permitting reading current to pass to the electrochemical cell. With this arrangement, the reading current does not persist past the time at which the voltage across the electrochemical cell first rises and, although the small amount of plating metal which may then still remain on the electrochemical cell electrode being deplated represents an error during this cycle of reading, this error will be averaged over all later readings of the electrochemical cell and hence becomes insignificant when a substantial number of such readings are accumulated. For example, the total number of miles travelled by a vehicle after a substantial number of read-outs will be determined with very little error.

In addition, provision is made to use the same supply voltage source for the first multivibrator as for the source of the read-out current. Where the cell and its charging circuits are carried on a vehicle and the reading apparatus is at a central station, for example, during the read-out procedure the read-out circuits are connected so that the voltage source on board the vehicle constitutes the supply source for the reading current. Accordingly, differences in supply voltage which might occur if two different sources were used are mitigated, and slow changes in supply voltage, due for example to aging of supply batteries which would tend to decrease the amount of charging of the electrochemical cell per input pulse, are effectively cancelled out by a correspondingly proportional decrease in the reading current, again resulting in higher accuracy of read-out.

BRIEF DESCRIPTION OF FIGURES

These and other objects and features of the invention will become more apparent from consideration from the following detailed description, taken in connection with the accompanying drawings, in which:

FIG. 1 is a schematic diagram of one preferred embodiment of the invention;

FIGS. 2A, 2B, 2C, 3A, 3B and 3C are graphical representations to which reference will be made in explaining the operation of the invention.

DESCRIPTION OF SPECIFIC EMBODIMENTS

Referring now to the specific embodiment of the invention illustrated by way of example in FIG. 1, there is shown a rotating shaft 10, the number of revolutions of which are to be counted. Shaft 10 may be directly connected to a rotating wheel of a vehicle such as a bus, or, more typically, is a specially provided stub shaft geared to the differential of the vehicle to turn in synchronism with the wheels. An appropriate magnet member 12 is mechanically connected to the shaft 10 to turn therewith, and a reed switch 14 is positioned adjacent to rotating poles of the magnet member so that the reed switch arm 16, normally spring-biased to the position shown against its lower contact 18, is moved upward against its upper contact 20 twice during each rotation of the magnet member 12. The reed switch arm 16 is connected to a source of reference potential designated as ground, which may be the metal frame of the vehicle. The reed switch circuit is typically mounted in a small box adjacent the rotating magnet member, and leads 22, 24 and 26 and their associated respective contact pins 22A, 24A and 26A are connected respectively to upper switch contact 20, lower switch contact 18 and ground.

The electronic circuit 30 for charging the electrochemical cell in response to the operation of the reed switch 14 may be located at any other convenient, readily-accessible portion of the vehicle, such as under the hood, on the dashboard or elsewhere. Pins 22A, 24A and 26A of the reed-switch unit are plugged into quick-disconnect sockets 32, 34 and 36, respectively, of circuit 30 during normal operation. A further socket 38 is provided for circuit 30, into which is plugged the lead 40 from the positive source of supply voltage 42, typically comprising the vehicle storage battery of 12 volts DC, for example.

Circuits 30 include first bistable multivibrator means 44, which may take any of a variety of known forms, and in this example comprises a pair of NPN transistors 46 and 48, the emitters of which are grounded and the collectors of which are connected through equal-valued resistors 50 and 52 to the positive supply line 54. The collector of transistor 46 is connected through resistor 56 and diode rectifier 58 to the base of transistor 48, diode rectifier 58 being poled so that its anode is connected to resistor 56. Similarly, the collector of transistor 48 is connected to the base of transistor 46 through a resistor 60 and a diode rectifier 62 poled in the same polarity as rectifier 58.

The positive supply voltage V+ on supply voltage line 54 is provided from battery source 42 by way of a forward-biased rectifier 70 and a series resistor 72; a relatively large-valued bypass capacitor 74 is connected from the junction of resistor 72 and rectifier 70 to ground. A zener voltage-regulating diode 78 is connected between the output end of resistor 72 and ground to maintain the supply voltage at a fixed value. This circuit serves to maintain the supply voltage substantially constant despite tendencies to change in response to operation of the alternator or in response to spurious interfering signals. Thus resistor 72 and zener diode 78 prevent the supply voltage from deviating from a fixed level, here typically 4.7 volts, capacitor 74 tends to filter out interfering electrical noise, and diode 70 prevents passage of negative transient interfering voltages.

The anode of rectifier 62 is directly connected to the anode of a further rectifier 79, the cathode of which is connected to socket 32, and the anode of rectifier 58 is connected to the anode of rectifier 81, the cathode of which is directly connected to the socket 34. The ground line for circuit 30 is also connected to the socket 36 and thence to the reed-switch ground.

Multivibrator means 44 has two stable states, one of which it assumes when reed switch arm 16 is in its upper position and the other of which it assumes when the reed switch arm is in its lower position. More particularly, since switch arm 16 is grounded, when reed switch 16 is in its upper position reed switch contact 20 is connected to ground, thereby to reduce the voltage at the base of transistor 46 to a point at which it becomes cut off, thereby to turn on transistor 48. Operation of the reed switch arm to its lower position changes the multivibrator to its opposite state by grounding the lower switch contact 18 and thus reducing the voltage on the base of transistor 48 to cut it off and turn on the other transistor 46. The basic configuration of the multivibrator 44 is conventional, the four diodes 58, 62, 79 and 81 associated therewith being optional and provided in this preferred embodiment to minimize sensitivity of the multivibrator to spurious transient voltages which commonly appear on the leads from the reed switch contacts in typical operating conditions, as on a bus.

FIG. 2A illustrates the idealized waveform of the signal appearing at the collector of transistor 48, constituting a series of substantially rectangular voltage pulses formed by the variation of the collector voltage of transistor 48 between a fixed relatively positive value near V+ (e.g., 4.7 volts) when it is off, and a lower value of substantially ground potential (e.g., 0.1 volts) when it is turned on, these two levels of output voltage corresponding to the two alternate bistable states of the multivibrator means as controlled by the position of the reed-switch arm 16. In this connection it is noted that reed-switch devices such as 14 often exhibit "chatter" or "bounce" whereby the switch arm after initially moving to either of its contacts may bounce away from it one or more times, breaking the original electrical connection at such times. Such a reed switch, if merely connected for example in series with a battery and load, would produce a pulse across the load for each closing of the switch arm to the contact, and therefore the pulses generated would include spurious pulses due to chatter or bounce. As a result, a much greater number of pulses would be produced than would properly represent the rotation of the number 10. Application of pulses so generated to an electrochemical cell, for example, would therefore produce erroneous results due to the storage of spurious pulses due to bounce or chatter.

In the arrangement of the present invention, the use of the single-pole double-throw reed switch arrangement in conjunction with a bistable multivibrator causes the multivibrator to assume a particular one of its two states for each closure of the switch arm, and the multivibrator remains in this state even if subsequent chatter or bounce occurs. Accordingly, chatter or bounce is in effect ignored by the multivibrator, and its harmful effects prevented from acting on the electrochemical cell. As a result, a substantial improvement in accuracy of the system is realized. However, it is noted that the amplitude of the pulses of FIG. 2A appearing at the output of the multivibrator 44 will vary with changes in the supply potential on line 54.

The output pulses shown on FIG. 2A are then subjected to differentiation and clipping and the unclipped differentiated pulses are applied to the electrochemical cell 80. More particularly, the collector of transistor 48 is connected through capacitor 82 and series resistor 84 to one electrode of the electrochemical cell 80, preferably the so-called "working" electrode, the other or "case" electrode of which is grounded. If these were the only interconnecting elements of this circuit, the relatively short time-constant of capacitor 82 in combination with the effective resistance of resistor 84 and cell 80, compared with the duration of the pulses of FIG. 2A, would produce across the cell 80 the series of pairs of differentiated, narrow, voltage pulses or pips shown in FIG. 2B. Thus, the voltage waveform of FIG. 2B comprises a narrow, positively-going voltage pulse corresponding to the positively-going leading edge of each multivibrator output pulse, and a negatively-going, narrow, differentiated pulse corresponding to the negatively-going lagging edge of the multivibrator output pulse. However, because of the presence of the clipping circuit now to be described the positive-going differentiated pulses are substantially eliminated.

A diode rectifier 86, typically a semiconductor diode rectifier, is connected between the output side of capacitor 82 and ground so as to become highly conductive when the signal line 87 becomes positive with respect to ground by more than the turn-on voltage of the rectifier, while having no effect when the voltage on line 87 is less than this value. Accordingly, rectifier 86 prevents signal line 87 from becoming appreciably more positive than the turn-on voltage level of rectifier 86, typically about 0.6 volt. This action tends to eliminate the positive differentiated pulses shown on FIG. 2B, while leaving the negative differentiated pulses. However, rectifier 86 will clip off only the portion of the differentiated signal above its turn-on level, represented by the horizontal broken line in FIG. 2B. Since the differentiated pulses have much of their energy in their wider portions near the zero voltage level, a substantial portion of the energy of the positive differentiated pulses remains unremoved if the diode rectifier 86 is the only clipping instrumentality. This remaining energy will be opposite to that applied to the electrochemical cell 80 by the negative differentiated pulses, thereby producing a much smaller net charging effect on the electrochemical cell with a resultant loss in sensitivity and accuracy.

According to one feature of the circuit of the invention, this remaining portion of the energy of the positive differentiated pulses is dissipated, and substantially complete clipping obtained, by the use of a transistor device 88, the collector of which is directly connected to the signal line 87, the emitter of which is directly connected to the ground line, and the base of which is connected through resistor 90 to the collector of transistor 48. Transistor 88 in this example is of the NPN variety, and the conductance between its collector and emitter is controlled by the level of the signal applied to its base control electrode. When the multivibrator pulse of FIG. 2A switches to its high level, it immediately renders transistor 88 strongly conductive to supplement the clipping action of diode 86. Since the collector-to-emitter voltage drop in transistor 88 when in saturation can typically be about 0.1 to 0.2 volt, it exerts a strong clipping action on portions of the positive differentiated pulse in the region from about 0.1 to the turn-on voltage of the diode 88, typically about 0.6 volt. The positive differentiated voltage pulse is thereby nearly completely removed from line 87, as illustrated in FIG. 2C. When the multivibrator output pulse switches to its low state, transistor 88 is cut off nearly immediately, and in any event is very inefficient as a conductor of emitter-collector current in the direction opposite to its intended current direction, so that the negative differentiated pulse is not materially affected, as also shown in FIG. 2C.

Accordingly, electrochemical cell 80 receives substantially only a single negatively-directed, narrow, differentiated pulse of voltage across it for each cycle of operation of the reed switch arm, the energy of which negative pulses depends substantially only on the value of the positive supply voltage on line 54, and on the value of capacitor 82, which is fixed. While it might be thought that transistor 88 could be used alone without rectifier 86 to accomplish the clipping action, it would then be required to accomplish all of the dissipation of the energy in the positive differentiated pulses and would then have to be a relatively high power level transistor, which typically would have a higher minimum collector-to-emitter voltage and hence would not accomplish as effective clipping at the desired extremely low level, and also would be more expensive. In the combination shown herein, the diode rectifier 86 provides a large portion of the dissipation of the energy of the positive differentiated pulses, and the relatively low power transistor 88 accomplishes dissipation of substantially the entire remainder of this energy to accomplish extremely low level clipping as desired.

Each of the negative differentiated pulses of FIG. 2C applied to electrochemical cell 80 then causes plating of a corresponding predetermined amount of metal from the case electrode of the electrochemical cell onto the working electrode; the amount of metal so-plated over a period of time is therefore a measure of the total number of such pulses and of the total number of revolutions of shaft 10 occurring during any selected time interval.

Circuit 30 is provided with three connector pins, 92, 94, 96 connected respectively to the positive supply line 54, the underground working electrode of the electrochemical cell 80, and the ground line for unit 30. These pins are adapted to be detachably connected into corresponding sockets 97, 98 and 99 of the cell-reading unit constituting the remainder of the apparatus. The cell-reading unit may typically be located at a central station such as a bus depot, and the sockets 97, 98 and 99 made part of a receptacle at the end of a cable for plug-in connection to a socket on the vehicle containing the pins 92, 94 and 96. When a cell-reading is completed, the plug-in connection is broken and another vehicle having a similar on-board unit is plugged in for read-out purposes.

The read-out unit comprises a transistor 100 the emitter-collector path of which is connected in series with a resistor 102 between a positive supply line 104 and the socket 98, and thus to the working electrode of the electrochemical cell 80. The positive supply voltage on supply line 104 is provided directly from the supply line 54 in the on-board unit, by way of the pin and socket combination 92, 97. When transistor 100 is conductive, a substantially constant current of predetermined magnitude is thereby caused to flow through electrochemical cell 80 in the direction opposite to the direction of flow produced by the above-described negative differentiated pulses, i.e., in the direction to deplate that electrode which was plated during the revolution-monitoring operation. The read-out unit, over-all, provides this reading current, senses when deplating of the cell 80 is substantially complete by sensing an abrupt increase in the voltage across the cell, automatically and promptly terminates the reading current at this time, and measures the duration of the reading time by counting the number of regularly-spaced clock pulses occurring during the reading time.

More particularly, the reading time is that during which transistor 100 is in its conductive state. In this example, transistor 100 is of the PNP type and is normally biased out of conduction by the bias resistor 106 and 108 connected directly between base and emitter thereof. However, when the circuit 30 is plugged into the reading unit, the positive supply voltage on line 54 is supplied over lead 110 to logic curcuit 112 which responds by applying a reset signal over lead 114 to the reset input line of a multivibrator means 116. This multivibrator means may be of any known type, and in this example is an integrated circuit using cross-coupled NAND gates in known fashion.

Multivibrator 116 has two stable states, a set state and a reset state, and when placed in its reset state its output on lead 118 is at a sufficiently negative level to cause transistor 100 to become highly conductive and supply the above-described steady reading current to the cell 80. When the cell 80 has been discharged substantially completely, i.e., when substantially all of the plating has been deplated from the case electrode, the voltage across it will exhibit an abrupt increment in the positive direction. The working electrode of cell 80 is connected to the base of a transistor 120 of the NPN type which responds to the positive increment in voltage at its base to turn on and deliver a set signal to the set input line 122 of bistable multivibrator 116. This causes the multivibrator to revert to its set state in which the voltage on line 118 rises to turn off transistor 100, thus promptly and automatically terminating the reading current as soon as the voltage across cell 80 rises substantially.

The time duration of the reading current is in this case measured by measuring the time during which multivibrator 116 is in its reset state. To this end, line 130 from the multivibrator 116 is connected to one input of AND gate 134 so as to supply thereto a signal during the reset phase of the multivibrator which tends to render AND gate 134 transmissive. A clock 136 generates a series of clock pulses, also of the polarity to tend to render AND gate 134 transmissive, which clock pulses are supplied to the other input of the AND gate over line 138. Accordingly, clock pulses are delivered to the output lead 140 of AND gate 134 only during the times when reading current is being delivered to the cell 80.

The output of the clock pulses on output lead 140 are in this case applied to a pulse counter 142, which counts the number of pulses so-produced and indicates their accumulated total. This total represents the total number of clock pulses so-generated, and hence the duration of the reading current, the amount of plating which occurred in the cell since the last previous read-out thereof, and the number of revolutions of shaft 10 which have occurred since the last-previous read-out. The accumulated count from counter 142 may be displayed visually and/or may be supplied as an input to a computer.

Referring to FIG. 3A, ordinates represent the amount of plating in the electrochemical cell 80 in response to the differentiated pulses described previously herein, and abscissae represent time. The small steps on the graph of FIG. 3A indicate the increments in plating occurring in response to each differentiated pulse, of which there will, of course, be many more than are actually shown in the graph. The intervals containing no such steps represent times when the vehicle is at rest. The last level in the graph is intended to represent the time when the vehicle has been moved to a central depot and is standing ready for the read-out operation.

FIG. 3B is a graph in which the vertical dimension represents reading current in the case of the solid-line graph, and represents the amount of deplating of the cell 80 in the case of the broken-line graph; abscissae again represent time, to the same scale as in FIG. 3A. It will be seen that, for read-out, a constant current is applied to the cell 80, during which it is substantially linearly deplated, and as soon as substantially complete deplating has occurred, the reading current is abruptly terminated.

FIG. 3C represents the clock pulses reaching the counter 142, with abscissae as time to the same scale as in FIGS. 3A and 3B. As shown, clock pulses occur only during the reading-current time, and the number of such pulses produced therefore is a measure of the reading time. It will be understood that actually a much larger number of clock pulses are typically employed than are conveniently shown in the drawing.

Accordingly, the read-out arrangement just described provides accurate and reliable read-out with automatic termination of the reading current in response to a rise in voltage across the cell, even if this rise is small compared with the voltage across the cell when completely deplated. As explained previously herein, such automatic and prompt termination of the reading current at this time prevents further deplating of the small residual islands of deposits which sometimes remain even though the voltage across the cell has risen abruptly, so that the reading current accurately represents the amount of deplating which occurred during that particular read-out. Accordingly, even if a small amount of material remains deplated at the end of the read-out, producing a corresponding very small error, after a substantial number of such read-outs, e.g., 20, the total error will still be that due only to the amount of material remaining on the electrode at the end of each deplating, and when this is averaged over a large number of read-outs, the error in the total accumulated count is very small.

It is also noted that the same supply voltage source is used for the read-out as for the supply to the multivibrator 44 in the onboard unit. Accordingly, the supply voltage tends to be the same for cell charging as for cell read-out. Should there be a long-range gradual change in this supply voltage, substantial cancellation of the effects of such changes will be obtained. For example, should the supply voltage on the onboard unit become somewhat reduced, the first multivibrator pulse amplitudes will become somewhat less, the negative differentiated pulses charging the electrochemical cell will become proportionately less in energy, but the read-out current intensity will also become proportionately less, so that the time required to read the cell will be substantially the same despite the decrease in supply voltage.

Without thereby limiting the scope of the invention in any way, the following example of the values of parameters of one form of the invention are given in the interest of complete difiniteness.

Member 10 is geared to the differential of a bus to provide 1000 cycles of operation of the reed switch arm for each mile which the vehicle travels. Voltage source 42 is a 12-volt storage battery on the bus. Diode rectifiers 70, 80, 82, 62, 58 and 86 are each type 1N 4004. Transistors 46, 48, 88 and 120 are each type 2N 5224; transistor 100 is a type 2N 2946. Capacitors 82 and 74 have respective values of 0.05 microfarad and 2 microfarad respectively. The resistors have the following values: $R72 = 620$ ohms; $R60$ and $R90 = 360,000$ ohms; $R50$, $R52$, and $R84$, each $= 10,000$ ohms; $R56 = 20,000$ ohms; $R102 = 8,250$ ohms; $R108 = 620$ ohms; $R106 = 3,300$ ohms. Electrochemical cell 80 is a Bisset-Berman Type 205 E-cell, and the multivibrator circuit 116 is one half of a Texas Instrument Company Type SN7400N integrated circuit.

While the invention has been described with particular reference to specific embodiments in the interest of complete definiteness, it will be understood that it may be embodied in a variety of forms diverse from those specifically shown and described without departing from the spirit and scope of the invention as defined by the appended claims:

What is claimed is:

1. Apparatus for accumulating, storing, and reading out a quantity representative of the number of occurrences of specified events, comprising:

an electrochemical storage member containing a pair of electrodes and a plating material, said member being responsive to a current therethrough in one direction to plate said material from one of said electrodes onto the other of said electrodes and responsive to a current therethrough in the opposite direction to deplate said material from said other electrode and plate it onto said one electrode the same voltage source being employed to produce said plating and deplating currents;

means responsive to occurrences of said events for passing a predetermined amount of charge through said member in said one direction in response to each of said occurrences, thereby partially to deplate said one electrode and plate said other electrode;

means for passing a reading current of predetermined mined substantially-constant intensity through said member in said opposite direction after said partial deplating of said one electrode has occurred, thereby to institute deplating of said other electrode and plating of said one electrode;

means for terminating said reading current promptly in response to an increment in the voltage across said electrochemical member small compared with the increase in said voltage corresponding to zero current through said member, said increment occurring when said other electrode is nearly but not completely deplated; and means for producing indications of the duration of said reading current.

2. Apparatus in accordance with claim 1, in which said means for terminating said reading current comprises a bistable device connected to said terminating means and having a first state permitting application of said current to said electrochemical storage member and a second state preventing said application of current, means for operating said bistable device to said first state upon initial application of said reading current, and means for operating said bistable device to said second state upon the occurrence of said voltage increment.

3. Apparatus in accordance with claim 2, in which said means for producing indications of the duration of said current comprises means for generating clock pulses, and count indicator means for counting said clock pulses during times when said bistable device is in said first state but not when said bistable device is in said second state, and for indicating the count thereby attained.

4. Apparatus in accordance with claim 3, in which said count indicator means comprises an AND gate supplied at one input terminal with said clock pulses in the polarity to render said AND gate conductive and supplied at its other input terminal with a signal representative of the existence of said first state and also of a polarity to render said AND gate conductive.

5. Apparatus in accordance with claim 1, in which said means responsive to occurrences of said events comprises bistable multivibrator means responsive to each said occurrence to produce a fixed number of output pulses for each of said occurrences, and a source of supply voltage for operating said multivibrator, said pulses having an energy which varies substantially proportionally to the magnitude of said supply voltage, said means for passing said reading current through said member comprising impedance means in series with said source and said member, whereby the effects of changes in said magnitude of supply voltage on the energy of said pulses and on the intensity of said reading current tend to cancel each other with respect to the time required for deplating of said other electrode.

6. Apparatus in accordance with claim 1, in which said means responsive to occurrences of said events comprises bistable multivibrator means responsive to each of said occurrences to produce a fixed number of output pulses for each of said occurrences; means for differentiating each of said output pulses to produce a corresponding pair of differentiated pulses, one positive-going and one negative-going, for each of said output pulses; means substantially eliminating one pulse of each said pair, comprising semiconductor diode rectifier means, transistor means having a control electrode and a pair of electrodes the conductance between which is controlled by said control electrode, means for applying the output of said differentiating means across said rectifier means and between said pair of electrodes of said transistor means, and means for applying said output pulses of said multivibrator means to said control electrode; and means for applying the other pulse of each said pair to pass a charge through said member.

7. Apparatus in accordance with claim 1, wherein said means responsive to said occurrences comprises bistable multivibrator means and single-pole double-throw reed switch means responsive to said occurrences to operate said switch from one to the other of its two positions, and means connecting said switch means to said multivibrator means so that said switch means in one of its positions operates said multivibrator means to one of its states and in the other of its positions operates said multivibrator means to the other of its states.

8. Apparatus for accumulating, storing and reading out a quantity representative of the number of occurrences of an event, comprising:

single-pole double-throw reed switch means responsive to said occurrences to move its switch arm between its two switch contacts in response to a predetermined fixed number of said occurrences;

first bistable multivibrator means and a source of supply voltage therefor;

means for connecting said contacts of said switch means to said first multivibrator means so that when said switch arm is in contact with one of said contacts said first multivibrator means is in one of its states and when said switch arm is in contact with the other of said contacts said first multivibrator means is in its other state, thereby to produce output pulses at an output terminal of said multivibrator each comprising a positive-going change in voltage when said switch arm first contacts one of said contacts and a negative-going change in voltage at said output terminal when said switch arm first contacts the other of said contacts;

differentiating circuit means responsive to each of said output pulses for producing in response to each a first narrow differentiated pulse of a first polarity corresponding to said positive-going voltage change and a second narrow differentiated pulse of a second polarity corresponding to said negative-going voltage change;

semiconductor diode rectifier means supplied with said first and second differentiated pulses for substantially eliminating the portion of one of them exceeding a predetermined voltage level;

transistor means having a control electrode and a pair of electrodes the conductance between which is controlled by said control electrode, means for applying said differentiated pulses between said pair of electrodes of said transistor means, and means for applying said output pulses to said control electrode, thereby substantially to eliminate said one of said differentiated pulses;

an electrochemical storage member containing a pair of electrodes and a plating material, said member being responsive to a current therethrough in one direction to plate said material from one of said electrodes thereof to the other, and responsive to a current therethrough in the opposite direction to deplate said material from said other electrode and plate it onto said one electrode;

means for applying said others of said differentiated pulses to said electrochemical storage member to pass a predetermined amount of charge through said member in said one direction in response to each of said other differentiated pulses;

means for passing a reading current of predetermined substantially-constant intensity through said electrochemical storage member in said opposite direction after a plurality of said other differentiated pulses have been applied to said member to accomplish reading of said member, said last-named means comprising impedance means in series with said member and with said source of supply voltage;

means for terminating said reading current promptly in response to an increment in the voltage across said member, said terminating means comprising second bistable multivibrator means having a first state permitting said reading current to flow through said member, and responsive to said increment in voltage to change from one said state to its other state and to increase the impedance in series with said source and said member when in said other state thereof thereby substantially to terminate said reading current, and means for placing said second multivibrator means in said one state thereof when said reading is to be accomplished; and means responsive to said second multivibrator means for producing a number of clock pulses proportional to the time during which said second multivibrator means is in said one state thereof.

* * * * *